June 18, 1946.  J. T. MITTEN  2,402,428
VEHICLE UNDERCARRIAGE
Filed July 13, 1944
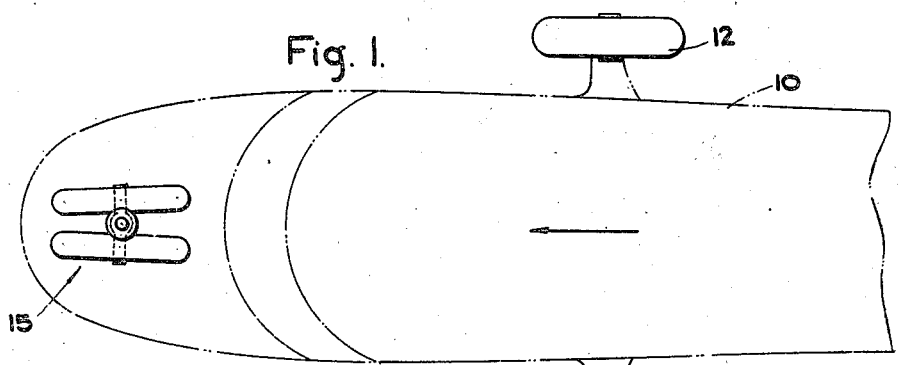
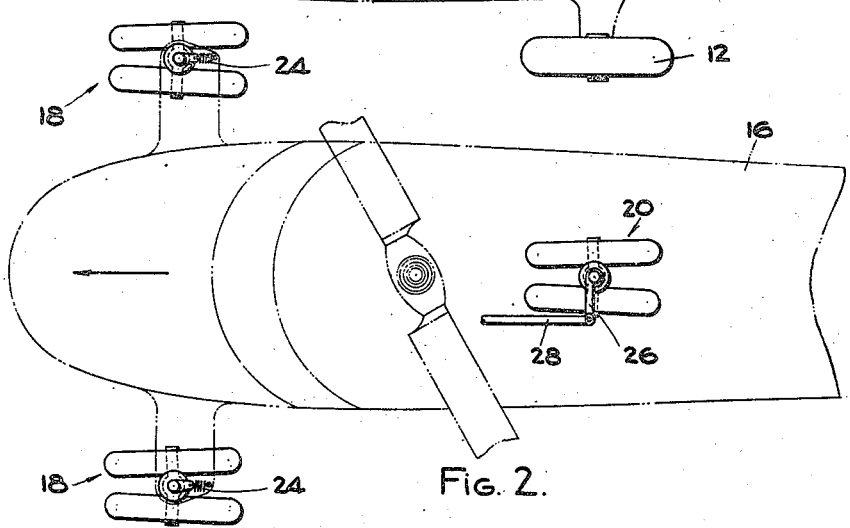
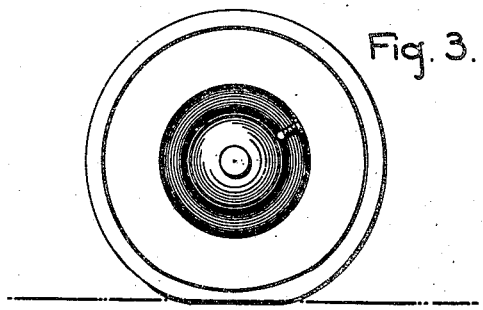
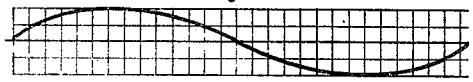
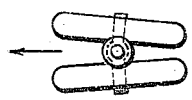
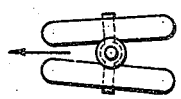
INVENTOR.
JOHN T. MITTEN
BY
Bean, Brooks, Buckley & Bean.

Patented June 18, 1946

2,402,428

UNITED STATES PATENT OFFICE 2,402,428

VEHICLE UNDERCARRIAGE

John T. Mitten, Buffalo, N. Y., assignor to Bell Aircraft Corporation, Buffalo, N. Y.

Application July 13, 1944, Serial No. 544,684

7 Claims. (Cl. 244—103)

This invention relates to undercarriage devices such as aircraft landing wheel units which are carried by the mounting vehicle so as to be either castoring or steerable. It is well known that castoring and steerable wheels tend to oscillate or "shimmy" about their directional turn axes, especially under higher speed taxiing conditions; and that shimmying is conducive to undesirable vibration and interference with steering and safe control of the vehicle.

Numerous methods have been previously devised with a view to eliminating such difficulties, such as coupling elastic force or hydraulic or frictional damping accessory devices to the wheel posts whereby to restrain the wheels against their tendencies to oscillate and to urge the wheels to remain in centrally directed positions. However, such restraining and damping mechanisms of the prior art are purely auxiliary to the basic wheel axle and post elements, thereby adding materially to the weight and mechanical complications of the complete wheel unit assembly; and it is a primary object of the present invention to provide an improved castoring or steerable ground wheel unit for aircraft or the like which requires no structural or mechanical elements accessory to the basic axle post and wheel elements, and which is inherently stable against shimmying tendencies through application of a newly discovered principle of tire tread reaction to ground friction forces. Another object of the invention is to provide a rubber-tired vehicle undercarriage device which is inherently stable against "shimmying" tendencies, and which comprises only basic wheel and axle post elements and requires no accessory motion-restraining and damping mechanism, or the like. Other objects and advantages of the invention will appear in the specification hereinafter.

In the drawing:

Fig. 1 is a fragmentary schematic plan of a vehicle such as an aircraft body supported by a tricycle type undercarriage of which the nose wheel unit embodies the features of the invention;

Fig. 2 is a similar view showing a helicopter aircraft body mounting a steerable tail wheel unit and paired free-castoring front wheel units of the invention;

Fig. 3 is a side elevation of a typical undercarriage wheel demonstrating the tire deforming effects of the mounting vehicle load;

Fig. 4 is a graphical representation of the cyclic variations of tire-tread deforming force effects which tend to produce shimmying of a conventional undercarriage wheel arrangement;

Fig. 5 is a diagrammatic plan of a dual wheel unit such as is inherently unstable; and Fig. 6 is a view similar to Fig. 5 of an inherently stable wheel unit of the invention.

The invention is illustrated in Fig. 1 in conjunction with a vehicle body designated 10; which body may comprise for example the fuselage or passenger compartment of an aircraft or an automobile, or the like. The undercarriage arrangement of Fig. 1 is generally similar to the presently popular tricycle type airplane landing gear wherein the nose wheel element is steerable about a generally vertical spindle for directional control of aircraft taxiing maneuvers. Thus, the undercarriage of Fig. 1 includes a pair of parallel and directionally fixed landing wheels 12—12 at opposite sides of the body 10 and rearwardly at the center of gravity thereof. In place of a usual nose wheel arrangement ahead of the center of gravity, the undercarriage of Fig. 1 embodies a nose wheel unit of the invention as designated generally at 15. As will be explained hereinafter the wheel unit 15 is so provided as to be inherently self-stabilizing relative to the axis of steering movements of the wheel unit under ground taxiing conditions. In Fig. 2 the invention is illustrated as being applied to the undercarriage of a helicopter fuselage or the like which is designated generally at 16; which undercarriage includes a pair of castoring wheel units 18—18 of the invention arranged at opposite sides of the fuselage forwardly of the center of gravity, and a steerable tail wheel unit 20 which also embodies the features of the invention.

A castoring or steerable wheel mount of conventional form normally tends to oscillate about the castoring or steering axis of the wheel post under ground taxiing conditions, as a result of deformation of the elastic tire tread material under the vehicle load. For example, as shown in Fig. 3, the vehicle load deforms the tire tread in such manner as to substantially reduce the radius from the wheel rotation axis to the tire tread in the region of its ground contact. Consequently, the tread circumference based upon the free diameter of the tire is greater than the circumference based upon the ground contact diameter, and there is therefore a surplus of tire tread material at the region of the ground contact to be absorbed in the tire tread structure. This is accomplished by compression flexures of the resilient tread material in all directions away from the zone of ground contact, and although some of this surplus material is absorbed peripherally of the tire tread, the presence of this surplus material causes the tire tread to be also subjected to compression forces directed normal to the plane of the landing surface. In the case of tires set in the direction of vehicle travel this results in tendencies of the excess tread material to teeter laterally over the crest of the ground contact zone; and the resiliency characteristic of the tread material causes such teetering to occur alternately in opposite direction away from the centerline of the wheel contact path. Hence, the deformed tread surface presented to the ground might be likened to the undulant edge of an accordion-pleated elastic surface, and it is this effect that generates forces tending to cause the wheel to "shimmy" about the turning axis of its mounting post to follow a typical sine wave path such as is illustrated diagrammatically in Fig. 4.

If a wheel is set at an angle to the direction of motion of the mounting vehicle the deflection of the excess material of the wheel tire tread remains constant in the same direction laterally of the direction of vehicle motion; and the present invention contemplates provision of a pair of wheels to be mounted upon a common centrally disposed post in relatively fixed positions and in generally side-by-side relation but non-parallel so as to diverge symmetrically of the direction of vehicle motion in such manner as to provide automatically a neutralization of the oppositely directed lateral pulling forces upon the wheels of the unit. To obtain the desired result, however, the wheels of such a unit must be relatively arranged in a particular fashion.

For example, if the wheels were to be arranged as shown in Fig. 5 so as to toe outwardly in opposite directions relative to the general direction of vehicle travel, the tread deflection of each wheel tire would be thrown toward the outside. Then whenever the right hand wheel turns slightly toward the right, for example, its tread deflection toward the right will be increased while the corresponding turning of the left hand wheel toward the right will result in a decrease of the degree of tread deflection toward the left of the left hand wheel. Thus, the lateral forces upon the dual wheel would be unbalanced, and a wheel unit of this character is therefore inherently unstable. However, if the dual wheels are arranged in accord with the principles of the present invention, and as shown in Figs. 1, 2 and 6 of the drawing, that is; toed in toward the center line of vehicle motion, the tread deflection of each wheel tread will be directed inwardly. Therefore, if, for example, the right hand wheel turns to the right in response to impact with an irregularity of the ground surface, or the like, the degree of its lateral tread deflection will be decreased while at the same time the corresponding turning of the left hand wheel will provide an increase of the degree of lateral deflection of the tread of the left hand wheel. This will automatically impose an increased drag on the wheel at the left hand side of the mounting post such as will provide an immediate restoring force, and consequently the wheel unit of the invention is inherently stable about the turning axis of the mounting post.

It will preferably be arranged that the angles of directional settings of the wheel tread elements of the invention relative to the general direction of vehicle travel are as slight as possible in view of the tire tread elasticity characteristics and the vehicle load and velocity and the spindle moment of inertia, so as to minimize parasite drag and provide as compact a wheel unit as possible while still producing a satisfactory degree of inherent stability.

As explained hereinabove, Fig. 1 illustrates application of the invention to a freely castoring nose wheel unit 15 of an otherwise conventional tricycle type airplane landing gear. Fig. 2 illustrates application of the principles of the invention to an undercarriage which is particularly advantageous for use in a helicopter airplane or the like and which comprises paired wheel units of the invention at the forward end of the fuselage and a single steerable wheel unit of the invention rearwardly of the center of gravity. To facilitate landings in sidewise directions relative to the fuselage the wheel units 18—18—20 of Fig. 2 are all of the castoring type. In some cases it may be preferred to provide such wheel units to be "freely" castoring, but I have shown a particularly advantageous arrangement wherein the front wheel units 18—18 are provided with automatic centralizing devices such as tension springs at 24—24 connected to horns extending from the wheel spindles, and the rear wheel unit 20 is shown to be provided with a steering horn 26 and a push-pull member 28 for pilot manipulation to guide the taxiing course of the aircraft. It will be understood, however, that the wheel units of the invention may be rearranged and otherwise employed, as may be desired.

Thus, it will be appreciated that the invention contemplates broadly, provision of oppositely paired wheel tread elements which are relatively aligned in directions converging ahead of the wheel unit while being symmetrical of the plan view center line of direction of wheel unit travel. Hence, the tendencies of paired tread elements to swing the wheel unit laterally are normally balanced but operate differentially whenever the wheel unit initiates any deviation from its proper path so as to provide automatically increasing oppositely directed lateral pulling forces. Thus, the tread reaction forces upon the ground operate inherently, whereby to steer the wheel unit back into properly directed attitude from any deviation therefrom. It will of course be understood that this feature of the invention may be obtained through use of wheel units other than the specific form thereof shown by way of example in the drawing and discussed in detail hereinabove. For instance, the wheel unit may comprise any desired number of paired wheels at opposite sides of the mounting post in lieu of only the single pair type unit illustrated and described hereinabove; and the features of the invention may be obtained through use of any other paired tread arrangement wherein the tread elements of the wheel unit are resilient and oppositely paired and relatively aligned in directions converging forwardly of the general direction of wheel unit travel. Thus, although only one form of the invention has been shown and described in detail it will be apparent to those skilled in the art that the invention is not so limited but that various changes may be made therein without departing from the spirit of the invention or the scope of the appended claims.

I claim:

1. In a wheeled vehicle having a body, an undercarriage including a bracket, pivotal means supported by said vehicle for mounting said bracket to rotate about a single substantially vertical axis, a pair of spaced wheels rotatably mounted upon said bracket at opposite sides of said pivotal means and having their axes relatively fixed, said wheels being so positioned as to have their planes of rotation substantially vertical and converging in the direction of vehicle motion, and said wheels being symmetrically arranged with respect to a vertical plane intersecting said vertical axis and the line of motion of said vehicle.

2. In a wheeled vehicle having a body, a directionally stable undercarriage comprising, a bracket, a wheel post supported by said body for mounting said bracket to rotate about a single substantially vertical axis, a pair of spaced wheels rotatably mounted upon said bracket and equidistantly arranged at opposite sides of said post and having their axes relatively fixed, said wheels being so positioned as to have their planes of rotation substantially vertical and converging in the direction of vehicle motion, said wheels being symmetrically arranged with respect to a vertical plane intersecting the axis of said post and the line of motion of said vehicle.

3. An airplane undercarriage comprising, paired wheel units at opposite sides of said airplane ahead of the center of gravity thereof, a wheel unit including a bracket, a wheel post supported by said body for mounting said bracket to rotate about a single substantially vertical axis, a pair of spaced wheels rotatably mounted upon said bracket and equidistantly arranged at opposite sides of said post and having their axes relatively fixed, said wheels being so positioned as to have their planes of rotation substantially vertical and converging in the direction of vehicle motion, said wheels being symmetrically arranged with respect to a vertical plane intersecting the axis of said post and the line of motion of said vehicle.

4. A vehicle undercarriage comprising, a wheel unit having opposite paired wheel tread elements having their axes of rotation relatively fixed, pivotal means for mounting said unit to rotate about a single substantially vertical axis, said elements being so positioned as to have their planes of rotation substantially vertical and converging in the direction of vehicle motion.

5. In a wheeled vehicle having a body, an undercarriage including a bracket, pivotal means supported by said vehicle for mounting said bracket to rotate about a single substantially vertical axis, a pair of spaced wheels rotatably mounted upon said bracket at opposite sides of said pivotal means and having their axes relatively fixed and intersecting the axis of said pivotal means, said wheels being so positioned as to have their planes of rotation substantially vertical and converging in the direction of vehicle motion, and said wheels being symmetrically arranged with respect to a vertical plane intersecting said vertical axis and the line of motion of said vehicle.

6. In a wheeled vehicle having a body, an undercarriage including a bracket, pivotal means supported by said vehicle for mounting said bracket to rotate about a single substantially vertical axis, a pair of spaced wheels rotatably mounted upon said bracket at opposite sides of said pivotal means and having their axes relatively fixed, said wheels being so positioned as to have their planes of rotation vertical and converging in the direction of vehicle motion, and said wheels being symmetrically arranged with respect to a vertical plane intersecting said vertical axis and the line of motion of said vehicle.

7. In a wheeled vehicle having a body, a directionally stable undercarriage comprising, a bracket, a wheel post supported by said body for mounting said bracket to rotate about a single substantially vertical axis, a pair of spaced wheels rotatably mounted upon said bracket and equidistantly arranged at opposite sides of said post and having their axes relatively fixed, said wheels being so positioned as to have their planes of rotation vertical and converging in the direction of vehicle motion, said wheels being symmetrically arranged with respect to a vertical plane intersecting the axis of said post and the line of motion of said vehicle.

JOHN T. MITTEN.